J. POWER.
NUTCRACKER.
APPLICATION FILED MAR. 14, 1914.
1,194,318.
Patented Aug. 8, 1916.
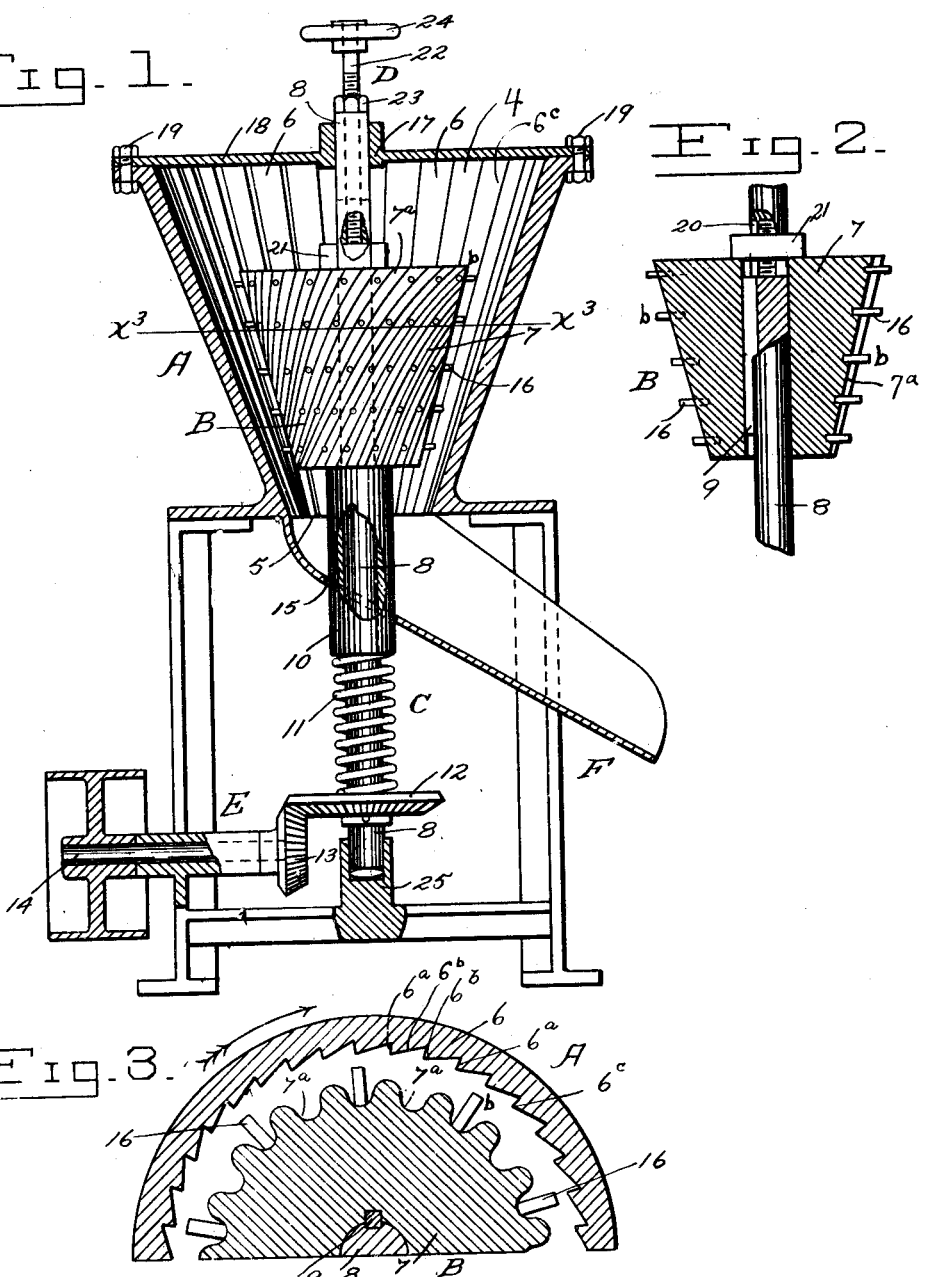
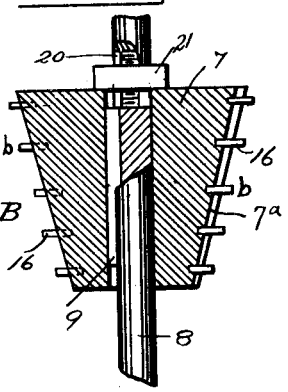
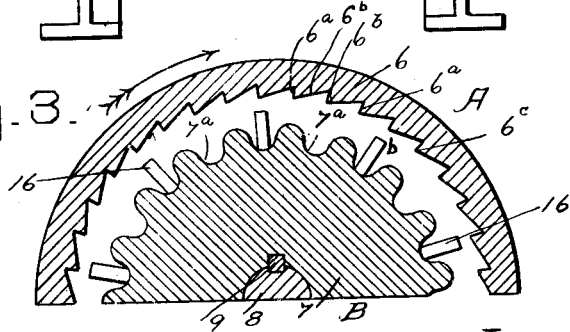
Witnesses;
H. Gearing
Alfred H. Daehler.
Inventor;
John Power,
By Raymond Ives Blakeslee,
His Attorney.

UNITED STATES PATENT OFFICE.

JOHN POWER, OF LOS ANGELES, CALIFORNIA.

NUTCRACKER.

1,194,318.  Specification of Letters Patent.  Patented Aug. 8, 1916.

Application filed March 14, 1914. Serial No. 824,709.

*To all whom it may concern:*

Be it known that I, JOHN POWER, a citizen of the United States, residing at Los Angeles, in the county of Los Angeles and State of California, have invented new and useful Improvements in Nutcrackers, of which the following is a specification.

This invention relates to nut crackers for separating the meats or kernels of nuts from the shells thereof and the invention has for its object to devise an improved nut cracker whereby the edible portions or meats may be removed with a minimum of crushing and breaking, which will be speedy in operation and have a relatively large output for a given period of operation, which will be free from liability to become clogged or jammed, which will be relatively simple and inexpensive in construction when its other features of superiority and increased efficiency are considered, and which will be generally superior in serviceability and adaptability to varying conditions of use for action upon different kinds and shapes of and characters of nuts and the like.

With the above and other objects in view, the invention consists in the novel and useful provision, formation, construction, combination, association and relative arrangement of parts, members and features, all as hereinafter described, shown in the drawing and finally pointed out in claims.

In the drawing: Figure 1 is a central vertical sectional view, partly in elevation, of a nut cracker constructed to embody the invention; Fig. 2 is a detail view of a portion of the showing in Fig. 1, partly broken away for fullness of illustration; and Fig. 3 is an enlarged detail fragmentary sectional view, taken on the line $x^3-x^3$, Fig. 1.

Corresponding parts in all the figures are designated by the same reference characters.

Referring with particularity to the drawing, the improved nut cracker shown therein comprises in the main a bowl or hopper A, a rotor B therein and having the two functions of agitating or mixing up or stirring up the work, and breaking or cracking the shells thereof between such rotor and the inner walls of the bowl or hopper A; a yielding support C for the rotor; means D for adjusting the rotor within the bowl or hopper upon such yielding support; and means E for operating the rotor. From the bottom of the bowl extends a discharge chute F through which the nuts and shells are directed to a suitable receptacle or point of deposit.

$b$ designates agitating and cracking and picking devices upon the rotor B, which add materially to the efficiency with which the nuts are cracked and re-presented in part or in whole for cracking, and by which the lodgment of the nuts or parts thereof upon the inner walls of the hopper A is prevented or terminated.

In the particular form of construction shown in the drawing, the hopper A is of inverted truncated conical formation, having a larger upper opening or mouth 4, and a smaller lower opening or mouth 5 from which the chute F extends. The inner walls of the hopper are channeled from top to bottom, plurally as at 6, the walls of each channel comprising respectively a substantially radial portion $6^a$ and a portion $6^b$ extending outwardly from the inner termination of the same at a wide range thereto and joining with the outer termination of the next adjacent portion $6^a$; whereby inwardly ranging sharp meeting edges or angular portions $6^c$ are produced. These channels necessarily taper slightly from top to bottom.

The rotor B comprises a truncated conical body 7, the wider end of which is upwardly presented and the narrow end of which is downwardly presented, the general conical pitch of such body corresponding to that of the hopper A with possibly a slight progressive approach of the outer walls of such body to the inner walls of the hopper A in a downward direction. This rotor body 7 is feathered upon a vertical shaft 8, as at 9, whereby it may play vertically thereof, and rests upon the yielding support C, through the agency of a sleeve or collar 10 surrounding the shaft 8 and bearing upon said support C which consists of a coil compression spring 11 which in turn rests upon a bevel gear 12 keyed to the shaft 8 and in mesh with a bevel pinion 13 upon a drive shaft 14, the drive means E being so constituted. The collar 10 is accommodated in a suitable bottom opening 15 in the chute F. The rotor body 7 is provided with a plurality of spaced spiral channels $7^a$ which are produced upon its outer surface, and each of which is developed from top to bottom of the body 7, through but a portion of the circumference, say ninety degrees thereof. These channels are produced by fluting the surface of the body 7, whereby alternating rounded ribs 7ᵇ are produced; and a cross section of the body 7 presents, as shown in Fig. 3, a wavy periphery the convolutions of which are regular and in curve at all points. In the channels 7ᵃ are arranged the devices b which consist of pins 16 which project outwardly from the body 7 to an equal extent beyond the periphery of the body 7, and the same are of such length that they clear the inner walls or angular wall portions or sharp edges 6ᶜ of the hopper A by a predetermined space which provides properly for the accommodation of the nuts in original and reduced form between the rotor B and the hopper A. The pins 16 are arranged in a plurality of spaced series, the pins of each series lying in a common transverse or horizontal plane.

The upper end of the shaft 8 is tubular, and is journaled in a suitable bushing or the like 17 mounted in a transverse bar or bracket 18 clamped at its ends, as at 19, to the top edge of the walls of the hopper A. The shaft 8 is likewise transversely slotted through a portion of its length, as at 20, to receive a transverse gib or key 21 which rests on the top of the rotor body 7, and may be vertically adjusted by a vertical shaft 22 which carries the gib or key 21 at its lower end and is threaded within the upper end of the shaft 8; a jam nut 23 being provided at the top of the shaft 8 for holding the shaft 22 and the key 21 in position of adjustment. A hand-wheel 24 is provided at the upper end of the shaft 22 for manipulating the same. The shaft 8 is journaled at its lower end in a step bearing 25.

The operation, method of use and advantages of the improved nut cracker constituting the invention will be readily understood from the foregoing description, taken in connection with the accompanying drawing and the following statement: The nuts, such as walnuts, pecan nuts, hazel nuts and the like, are fed into the hopper A at the open top thereof, and fall upon the rotor B and the downwardly inclined inner walls of the hopper A; the rotation of the rotor, in the direction designated by the arrow in Fig. 3, impelling the nuts which fall upon the rotor into the inter-space between the rotor and the hopper inner walls, where the nuts are acted upon by the grooves or channels 7ᵃ and the ribs 7ᵇ of the rotor and the agitating and cracking and picking devices b or pins 16 which project horizontally from the periphery of the rotor body 7. The rotor is, as shown, centered upon the shaft 8, and the same is set at the proper height or in the proper position within the hopper by the adjusting means D whereby the rotor may be depressed against or elevated under the action of the spring support 11, to the end that the proper dimensions of inter-space between the rotor body and the hopper walls will be provided, all in accordance with the shapes and dimensions of the nuts upon which the cracker is to operate. The rapid rotation of the rotor causes the nuts to be seized and crushed or cracked between the fluted walls of the rotor and the angular walls of the hopper, the unbroken and partially broken nuts being driven against the angular walls and the sharp edges or angular portions 6ᶜ of the hopper walls by the ribs and channels of the rotor body and the pins 16 upon the same. The pins 16 assist the rotor walls in the agitation of the broken and unbroken nuts, so that they may be presented and re-presented in positions for cracking or reducing, and also assist in such cracking and reducing, and serves further to pry or force out of the channels 6 in the hopper walls the partially broken nuts and fragments thereof which may find lodgment in such channels. As the inter-space between the rotor body and the hopper walls decreases in width downwardly, the nuts are reduced more and more finely, until they are suitably shelled or broken for final separation of the meats or kernels from the shell portions; whereupon they fall upon the chute F and are discharged. In cracking such nuts as English walnuts, the cracker operates to separate the meats from the shells without breaking or crushing the meats to any great extent, frequently leaving the kernel in halves which is the form in which they are of the most value, for such purposes as candy making and cake making.

In practice the nut cracker is found to operate with efficiency and accuracy even at a high speed, so that a large quantity of nuts may be cracked or shelled in a relatively short period of time; and continued operation may be maintained without cessation for the purpose of cleaning or clearing out the working parts, as the rotor and hopper are self-clearing, all as will be readily understood from the foregoing description and statement. To this end, also, the edges 6ᶜ assist in clearing the rotor channels 7ᵃ.

It is manifest that many changes may be made with respect to the specific provision, construction and organization and combination of parts, members and features, without departing from a fair interpretation of the invention and the spirit thereof.

Having thus described my invention, I claim and desire to secure by Letters Patent:

1. Mechanism of the character disclosed, comprising a conical hopper, a conical rotor mounted within the hopper, means for operating the rotor, there being a downwardly decreasing inter-space between the rotor and the hopper, the hopper being provided with downwardly ranging channels formed in its inner walls, and the rotor being provided with spirally produced channels in its periphery; said channels in the hopper walls being angular in formation and separated by edge portions to which the material is presented upon the rotation of the rotor; and the rotor being provided in the channels with spaced pins projecting beyond the periphery of the rotor.

2. Mechanism of the character disclosed, comprising a conical hopper, a conical rotor mounted within the hopper, means for operating the rotor, there being a downwardly decreasing inter-space between the rotor and the hopper, the hopper being provided with downwardly ranging channels formed in its inner walls, and the rotor being provided with spirally produced channels in its periphery; said channels in the hopper walls being angular in formation and separated by edge portions to which the material is presented upon the rotation of the rotor; and the rotor being provided with spaced pins projecting beyond the periphery of the rotor and seated in the channels in the rotor; said pins being generally distributed over the rotor surface from end to end thereof.

3. Mechanism of the character disclosed, comprising a conical hopper, a conical rotor mounted therein, there being an inter-space between the hopper and the rotor and the opposed walls of both being formed to engage and reduce material fed to the said inter-space; a vertical shaft in the hopper upon which the rotor is feathered, a yielding support for the rotor, means for rotating said shaft, a key above the rotor and lying within a transverse elongated slot in the shaft and in a tubular upper portion thereof, and an adjusting shaft threaded in said tubular portion of said rotor shaft and connected with said key; said rotor being provided with relatively small pins distributed generally over the surface thereof and projecting into the interspace between the rotor and the hopper.

4. A machine for cracking nuts of varying sizes, comprising a conical hopper provided with downwardly ranging channels formed in its inner walls, a conical rotor movably mounted within the hopper and decreasing in transverse section downwardly in such relation to the formation of the conical hopper that there is provided a downwardly decreasing inter-space between the rotor and the hopper, and the rotor being provided with curved channels produced in its periphery; said channels in the hopper being angular in formation and separated by edge portions to which the nuts are presented upon rotation of the rotor, and the rotor being-provided with spaced pins seated in the channels of the rotor and projecting beyond the periphery thereof and substantially equidistant from the walls of such channels and projecting materially beyond the rotor surface in curved series; said pins being uniformly distributed over the rotor surface from top to bottom thereof and terminating at their outer ends in decreasing distances from the opposed inner walls of the hopper; whereby the shells of the nuts are broken up and the meats extracted by the combined action of the inter-related channeled hopper walls and the walls of the rotor and the pins set in the grooves thereof, substantially as and for the purpose set forth.

In testimony whereof, I have signed my name to this specification in the presence of two subscribing witnesses.

JOHN POWER.

Witnesses:
RAYMOND IVES BLAKESLEE,
W. F. COOK.